United States Patent
Tsuji et al.

(10) Patent No.: US 11,897,218 B2
(45) Date of Patent: Feb. 13, 2024

(54) CLEANING DEVICE AND METHOD FOR CLEANING VULCANIZATION MOLD

(71) Applicant: The Yokohama Rubber Co., LTD., Tokyo (JP)

(72) Inventors: Mitsuo Tsuji, Hiratsuka (JP); Yoshinori Izumi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 252 days.

(21) Appl. No.: 16/968,536

(22) PCT Filed: Nov. 16, 2018

(86) PCT No.: PCT/JP2018/042395
§ 371 (c)(1),
(2) Date: Aug. 7, 2020

(87) PCT Pub. No.: WO2019/155715
PCT Pub. Date: Aug. 15, 2019

(65) Prior Publication Data
US 2021/0039345 A1     Feb. 11, 2021

(30) Foreign Application Priority Data
Feb. 9, 2018    (JP) .................. 2018-022230

(51) Int. Cl.
*B29D 30/06*     (2006.01)
*B23K 26/142*    (2014.01)
(Continued)

(52) U.S. Cl.
CPC ........ *B29D 30/0662* (2013.01); *B23K 26/142* (2015.10); *B23K 26/1464* (2013.01);
(Continued)

(58) Field of Classification Search
CPC ........ B29D 30/0662; B29D 2030/0663; B23K 26/142; B23K 26/1464; B23K 26/402;
(Continued)

(56) References Cited

U.S. PATENT DOCUMENTS 5,637,245 A * 6/1997 Shelton ................. B08B 7/0042
219/121.84
6,369,353 B1 * 4/2002 Soska .................... B29C 33/72
219/121.68
(Continued)

FOREIGN PATENT DOCUMENTS

CN     105618436 A * 6/2016
CN     105666753 A * 6/2016
(Continued)

OTHER PUBLICATIONS

International Search Report for International Application No. PCT/JP2018/042395 dated Dec. 11, 2018, 3 pages, Japan.

*Primary Examiner* — Tu B Hoang
*Assistant Examiner* — Damon Joel David Alfaro
(74) *Attorney, Agent, or Firm* — Thorpe North & Western

(57) ABSTRACT

Provided are a cleaning device and a method for cleaning a vulcanization mold. At the time of cleaning a molding surface of a vulcanization mold by irradiating with a laser beam from a laser head, an inert gas is supplied from a supply nozzle and an irradiation range of the molding surface irradiated with the laser beam is brought into an atmosphere of the inert gas.

14 Claims, 9 Drawing Sheets

(51) Int. Cl.
  *B23K 26/14* (2014.01)
  *B23K 26/402* (2014.01)
  *B29C 33/72* (2006.01)
  *B23K 103/00* (2006.01)
  *B23K 35/38* (2006.01)

(52) U.S. Cl.
  CPC ............ *B23K 26/402* (2013.01); *B29C 33/72* (2013.01); *B23K 35/383* (2013.01); *B23K 2103/30* (2018.08); *B29D 2030/0663* (2013.01)

(58) Field of Classification Search
  CPC .... B23K 2103/30; B23K 35/383; B29C 33/72
  USPC ...... 219/74, 121.68, 121.85, 121.69, 121.78, 219/121.79, 121.84, 121.77; 134/1, 21; 264/400
  See application file for complete search history.

(56) References Cited

U.S. PATENT DOCUMENTS

| | | | | |
|---|---|---|---|---|
| 2002/0041617 | A1 | 4/2002 | Itakura et al. | |
| 2011/0215076 | A1* | 9/2011 | Littlewood | B23K 26/364 219/121.85 |
| 2015/0329704 | A1* | 11/2015 | Miyazaki | B60C 1/0016 524/492 |
| 2016/0265570 | A1* | 9/2016 | Sabau | B29C 66/7212 |
| 2017/0136720 | A1* | 5/2017 | Matsumura | B29C 33/72 |
| 2017/0182722 | A1* | 6/2017 | Matsumura | B23K 26/36 |
| 2018/0319045 | A1* | 11/2018 | Matsumura | B23K 26/02 |
| 2021/0078211 | A1* | 3/2021 | Dettore | B25J 9/1664 |

FOREIGN PATENT DOCUMENTS

| | | | | |
|---|---|---|---|---|
| CN | 206264223 | U * | 6/2017 | |
| CN | 206264224 | U * | 6/2017 | |
| CN | 206326775 | U * | 7/2017 | |
| CN | 107377532 | | 11/2017 | |
| DE | 19933195 | A1 * | 1/2001 | ............. B29C 33/72 |
| DE | 202017103770 | U1 * | 8/2017 | ........ B23K 26/0096 |
| EP | 0792731 | A2 * | 9/1997 | ........ B23K 26/0096 |
| EP | 2695728 | A1 * | 2/2014 | ............. B24C 1/003 |
| JP | H10-128220 | | 5/1998 | |
| JP | H1199524 | A * | 4/1999 | |
| JP | 2002-118308 | | 4/2002 | |
| JP | 2016-034707 | | 3/2016 | |
| KR | 100905253 | B1 * | 6/2009 | |
| KR | 20100062042 | A * | 6/2010 | ............... B08B 7/00 |
| KR | 20160090410 | A * | 8/2016 | |
| KR | 101735373 | B1 * | 5/2017 | |
| RU | 2297886 | C2 * | 4/2007 | |
| WO | WO-9942228 | A1 * | 8/1999 | .......... B08B 7/0042 |
| WO | WO-2015049271 | A1 * | 4/2015 | ............. B29C 33/72 |
| WO | WO 2017/078131 | | 5/2017 | |

* cited by examiner

CLEANING DEVICE AND METHOD FOR CLEANING VULCANIZATION MOLD

TECHNICAL FIELD

The present technology relates to a cleaning device and a method for cleaning a vulcanization mold with a laser beam and particularly relates to a cleaning device and a method for cleaning a vulcanization mold, which can more easily prevent a rubber defect in a rubber product from being caused by vulcanized rubber adhering and remaining on a cleaning target portion cleaned with a laser beam when the vulcanized rubber is released from the mold in a vulcanization step.

BACKGROUND ART

In every vulcanization process, dirt derived from a rubber component or a compounding agent slightly adheres to a molding surface of a vulcanization mold used in manufacturing rubber products such as tires. Since the dirt gradually accumulates as the mold is used repeatedly, leaving the dirt as is negatively impacts the quality of the products to be vulcanized. Thus, as appropriate, the dirt needs to be removed by cleaning the molding surface. A shot blast cleaning method, a plasma cleaning method, and a laser beam cleaning method, or the like have been known as methods for cleaning a mold.

In the shot blast cleaning method, the molding surface is easily damaged. Accordingly, in order to prevent the molding surface from being damaged by cleaning, the plasma cleaning method in which dirt is chemically reacted by the generated plasma to be removed; or the laser beam cleaning method in which the molding surface is irradiated with a laser beam to remove dirt by the shock wave thereof is desirable. However, the area that can be cleaned by the plasma cleaning method in a unit of time is small, which requires time for maintenance. Thus, the laser beam cleaning method is more desirable in light of efficiency.

However, in a case where vulcanization is performed with a vulcanization mold cleaned by a laser beam, when vulcanized rubber is released from the mold, the vulcanized rubber adheres and remains on a molding surface of the mold. Accordingly, a rubber defect in a rubber product may be caused (see Japan Unexamined Patent Publication No. 2016-034707). For such a problem, irradiation of the molding surface with a laser beam to bring the molding surface into a desired state of recess and protrusion is proposed in Japan Unexamined Patent Publication No. 2016-034707. However, it is difficult to confirm whether the molding surface itself is in such a desired state of recess and protrusion proposed in Japan Unexamined Patent Publication No. 2016-034707 (an average interval between two adjacent protrusion portions is 4.7 μm or smaller).

SUMMARY

The present technology provides a cleaning device and a method for cleaning a vulcanization mold, which can more easily prevent a rubber defect in a rubber product from being caused by vulcanized rubber adhering and remaining on a cleaning target portion cleaned with a laser beam when the vulcanized rubber is released from a mold in a vulcanization step.

A cleaning device for a mold includes: a laser oscillator; and a laser head configured to irradiate a cleaning target portion of the vulcanization mold with a laser beam supplied from the laser oscillator. The cleaning device includes a gas supply unit configured to bring an irradiation range of the cleaning target portion irradiated with the laser beam into an atmosphere of inert gas.

A method for cleaning a vulcanization mold by irradiating a cleaning target portion of the vulcanization mold with a laser beam. The method includes: bringing an irradiation range of the cleaning target portion irradiated with the laser beam into an atmosphere of inert gas.

According to the present technology, the cleaning target portion is irradiated with the laser beam in the atmosphere of the inert gas. Thus, dirt on the cleaning target portion can be removed, and ultrafine protrusions having a nano-level size can be prevented from being formed on the cleaning target portion cleaned. As a result, a rubber defect in a rubber product can be more easily prevented from being caused by vulcanized rubber adhering and remaining on the cleaning target portion cleaned when the vulcanized rubber is released from the mold.

DETAILED DESCRIPTION

Figure 1:
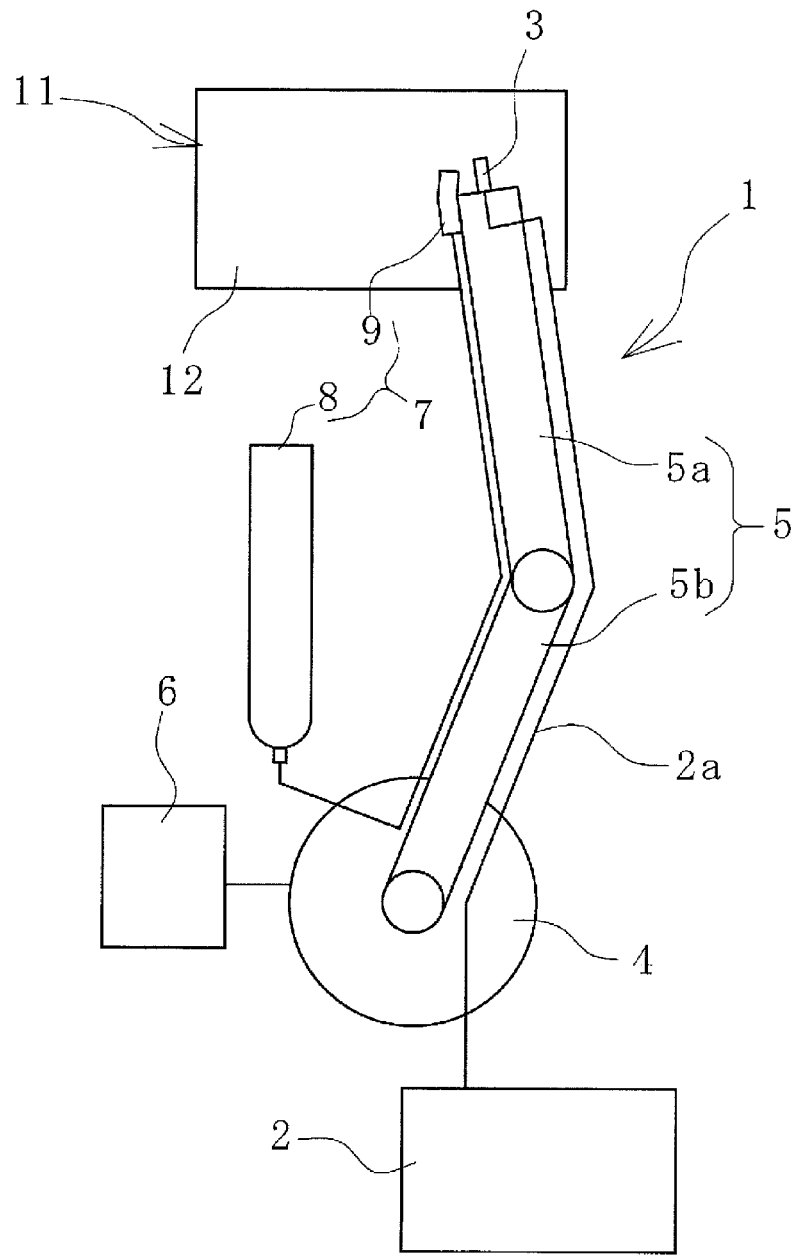
FIG. 1 is an explanatory diagram illustrating a cleaning device for a vulcanization mold according to an embodiment of the present technology in a plan view.

A cleaning device and a method for cleaning a vulcanization mold of the present technology is described based on embodiments illustrated in the drawings. Although what is to be cleaned is a tire vulcanization mold in the following description, the present technology can also be used to clean vulcanization molds for vulcanizing rubber products other than tires.

A cleaning device 1 for a vulcanization mold according to an embodiment illustrated in FIG. 1 is configured to remove a dirt X adhering to a cleaning target portion of a tire vulcanization mold 11 (hereinafter, referred to as a mold 11) with a laser beam L. The cleaning device 1 includes a laser oscillator 2, a laser head 3, and a gas supply unit 7 that supplies an inert gas G. The laser oscillator 2 and the laser head 3 are connected by an optical fiber cable 2a. The gas supply unit 7 includes a tank 8 containing the inert gas G, and a supply nozzle 9 connected via a hose to the tank 8.

The cleaning device 1 further includes: an arm 5 to which the laser head 3 is attached; and a controller 6 that controls the movement of the arm 5 and the laser head 3. The arm 5 is rotatably attached to an arm base 4 and is configured such that a plurality of arm portions 5a, 5b are rotatably connected. The laser head 3 is removably attached to an end portion of the arm 5.

The movement of the arm 5 is controlled, and thus the laser head 3 can be moved to a desired three-dimensional position. Since the supply nozzle 9 is also attached to the end portion of the arm 5, an end of the supply nozzle 9 can always be directed in the irradiation direction of the laser beam L.

The laser beam L supplied by the laser oscillator 2 is transmitted through the optical fiber cable 2a to the laser head 3. The laser beam L is radiated from the laser head 3 to a molding surface 12 of the mold 11, which is a cleaning target portion.

The gas supply unit 7 supplies the inert gas G housed in the tank 8 from the supply nozzle 9 toward an irradiation range of the molding surface 12 or a surrounding range of the irradiation range irradiated with the laser beam L. Thus, the irradiation range is brought into an atmosphere of the inert gas G.

The laser beam L in the related art used for cleaning the mold 11 can be applied to the laser beam L. Specific specifications of the laser beam L to be radiated are, for example, as follows. The type of the laser beam L is not particularly specified, but a Yb-YAG laser beam (wavelength of 1030 nm) and an Nd-YAG laser beam (wavelength of 1064 nm) are preferable. The output of the light source of the laser beam L is 1 W or greater and 5 kW or less, the pulse width is 1 ns or greater and 500 ns or less, the pulse energy is 1 mJ or greater and 0.1 J or less, and the pulse frequency is 1 kHz or greater and 100 kHz or less. The fluence is 0.5 $J/m^2$ or greater and 4.0 $J/m^2$ or less, the beam diameter (diameter) is 0.1 mm or greater and 3 mm or less, and the pulse overlap is 0 or greater and 100% or less. The line overlap is 0 or greater and 100% or less.

In the present embodiment, the laser head 3 that radiates the laser beam L with pinpoint precision is provided; however, the laser head 3 is not limited to such a type. For example, the type of the laser head 3 internally including a galvano mirror can be applied, in which the laser beam L is scanned in the width direction such that a wide range can be irradiated. The laser head 3 is not limited to a single laser head, and specifications including a plurality of the laser heads 3 may be provided. The same type of the plurality of laser heads 3 can be provided. Alternatively, specifications including different types of the laser heads 3 in combination can be provided.

Figure 2:
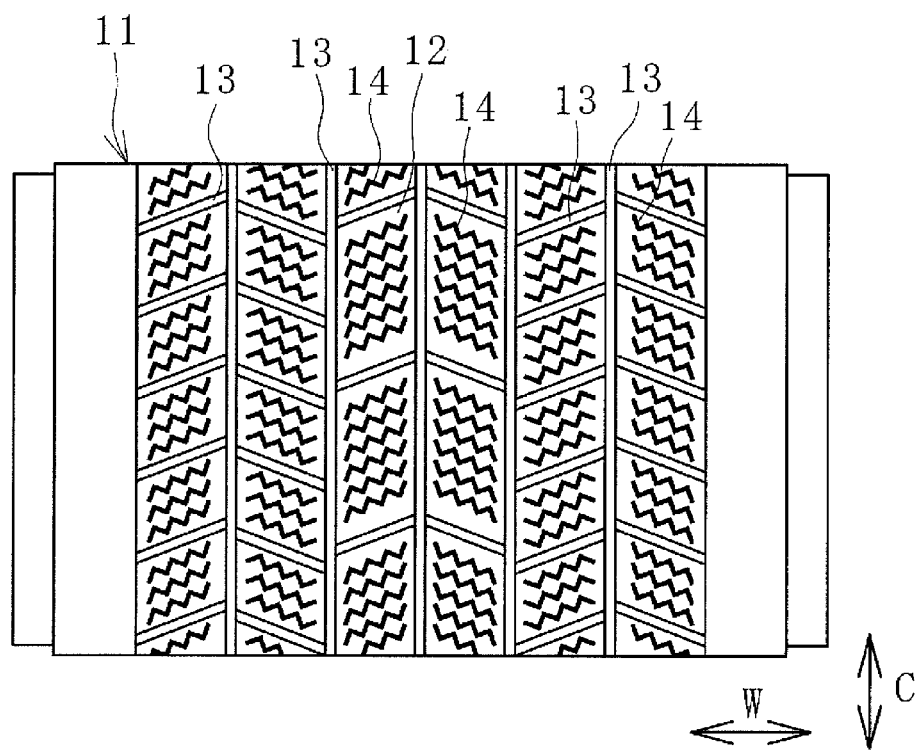
FIG. 2 is an explanatory diagram illustrating a molding surface of a studless-tire vulcanization mold in a plan view.

The mold 11 to be cleaned is not limited to the normal type of mold. For example, a studless-tire vulcanization mold illustrated in FIG. 2 can be also applied. Groove forming projections 13 and sipe forming projections 14 are projected on the molding surface 12 of the mold 11. The groove forming projections 13 are casted integrally with a base material of the mold 11, and the sipe forming projections 14 are attached to the molding surface 12, as a separate material from the base material of the mold 11. The base material of the mold 11 is usually made of aluminum and the sipe forming projections 14 are made of steel or the like.

The thickness of the sipe forming projections 14 is about from 0.4 to 1.2 mm. Thus, the surface and root portion of the sipe forming projections 14 or the groove forming projections 13 with the small thickness are portions from which the dirt X is difficult to be removed in the event of cleaning the mold 11. In addition, C arrow, R arrow, and W arrow that are illustrated in the diagram respectively indicate a circumferential direction, a radial direction, and a width direction of a tire that is to be inserted into the mold 11 and vulcanized therein.

Figure 3:
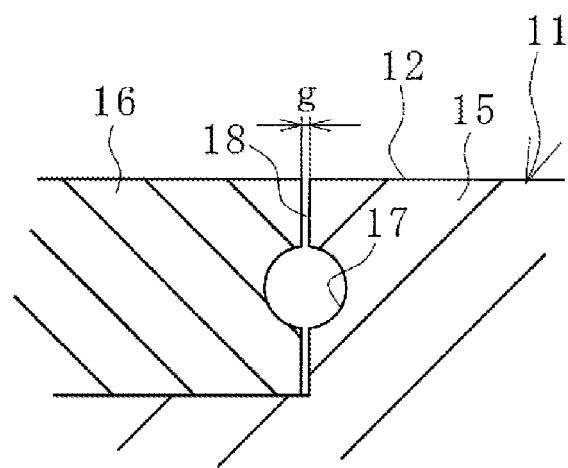
FIG. 3 is an explanatory diagram illustrating a molding surface of a cast splicing mold in an enlarged cross-sectional view.

Another example of the different type of mold 11 to be cleaned is a cast splicing mold for pneumatic tire vulcanization illustrated in FIG. 3. The mold 11 is produced by so-called cast splicing in which a first casting part 15 is casted and a second casting part 16 is casted thereafter. The casted melting metal is solidified and shrunk, and thus a small gap g is defined in a cast splicing part 18 between the first casting part 15 and the second casting part 16. The size of the small gap g is, for example, from 5 to 80 µm. An exhaust hole 17 in communication with the small gap g is defined. In the mold 11, unnecessary air or gas when the tire is vulcanized is discharged from the molding surface 12 to the exhaust hole 17 through the small gap g, and then discharged out of the mold 11 through the exhaust hole 17. The small gap g is a part from which the dirt X is difficult to be removed in the event of cleaning the mold 11.

Next, a method for cleaning the mold 11 is described.

Figure 4:
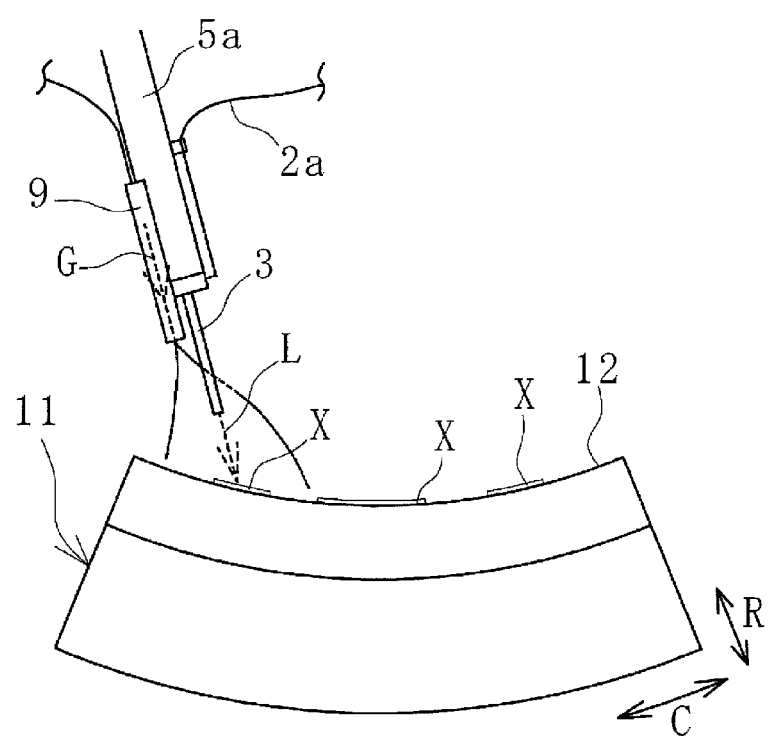
FIG. 4 is an explanatory diagram illustrating a state of cleaning the mold in a side view.
Figure 5:
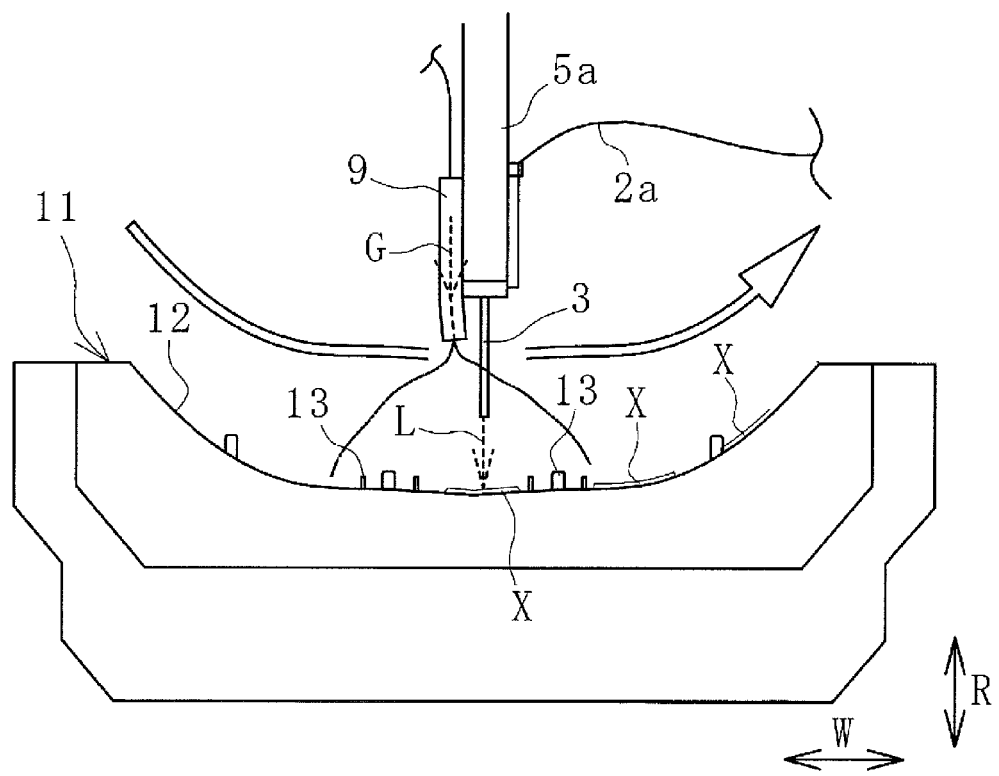
FIG. 5 is an explanatory diagram illustrating a state of cleaning the mold in a front view.

Cleaning of the mold 11 is performed in a cleaning booth that serves as a closed space. In the present embodiment, since the sector molds 11 are cleaned one by one, the single sector mold 11 is installed in a predetermined position as illustrated in FIG. 1. Thereafter, the movement of the arm 5 is controlled, and thus, as illustrated in FIGS. 4 and 5, the laser head 3 is moved along the molding surface 12 to be cleaned. While the laser head 3 is being moved in this way, the molding surface 12 is irradiated with the laser beam L supplied from the laser oscillator 2. Here, the inert gas G is supplied from the supply nozzle 9 toward the irradiation range where the laser beam L is radiated, and thus the irradiation range is brought into the atmosphere of the inert gas G.

Nitrogen gas, argon gas, or the like can be used as the inert gas G. From the perspective of availability, cost, handling, and the like, it is preferable to use nitrogen gas as the inert gas G.

The dirt X adhering to the molding surface 12 is removed and cleaned by the radiated laser beam L. The laser head 3 is moved to cover the range of the molding surface 12 as a cleaning target portion while radiating the laser beam L under the atmosphere of the inert gas G and thus cleans the molding surface 12.

In the present embodiment, the laser beam L is radiated while the inert gas G is being supplied toward the irradiation range of the laser beam L or a surrounding range thereof. This makes it advantageous to reduce the amount of the inert gas G used, and in the meantime, the inert gas G in the irradiation range is maintained at a high concentration.

Figure 6:
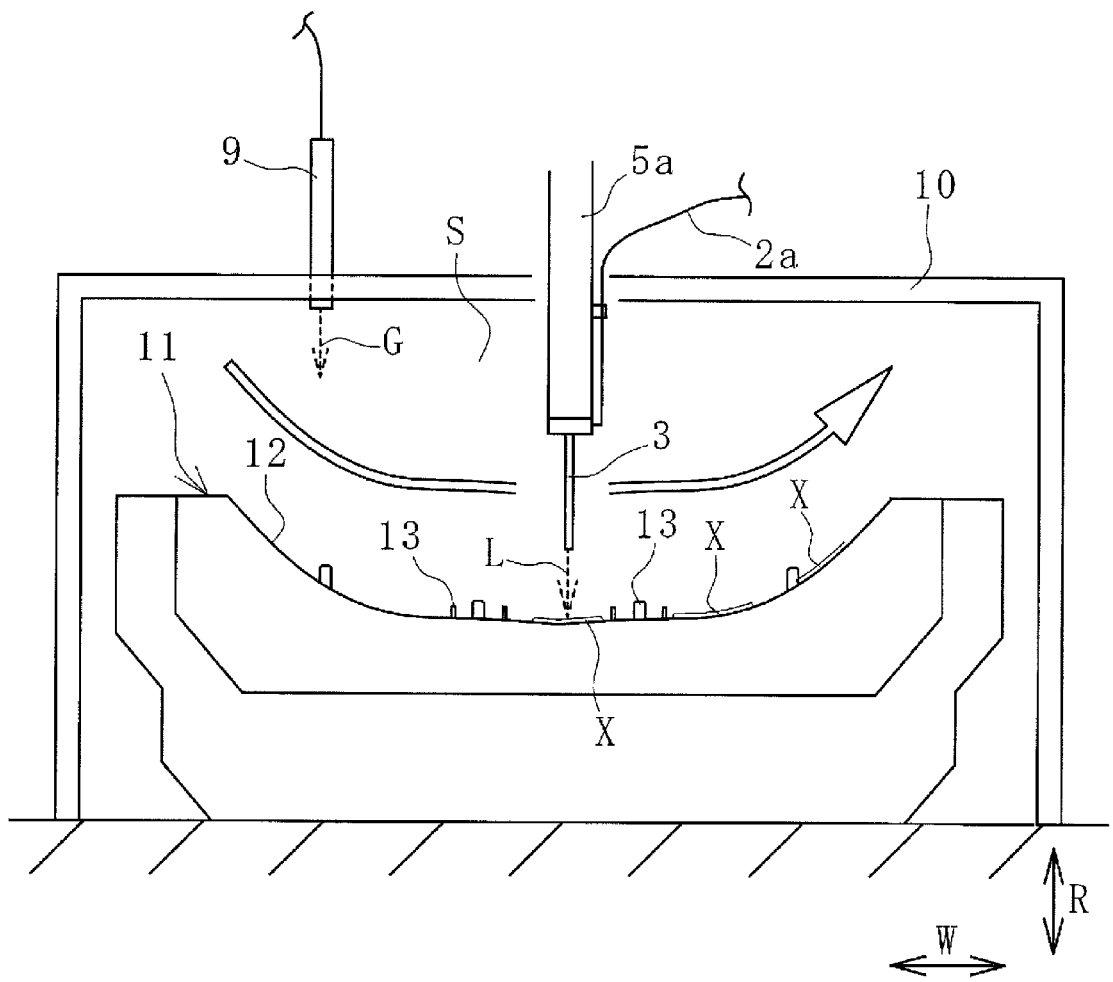
FIG. 6 is an explanatory diagram illustrating, in a front view, a state where a space surrounded in an irradiation range and a surrounding range thereof by a cover is filled with inert gas and the mold is being cleaned.
Figure 7:
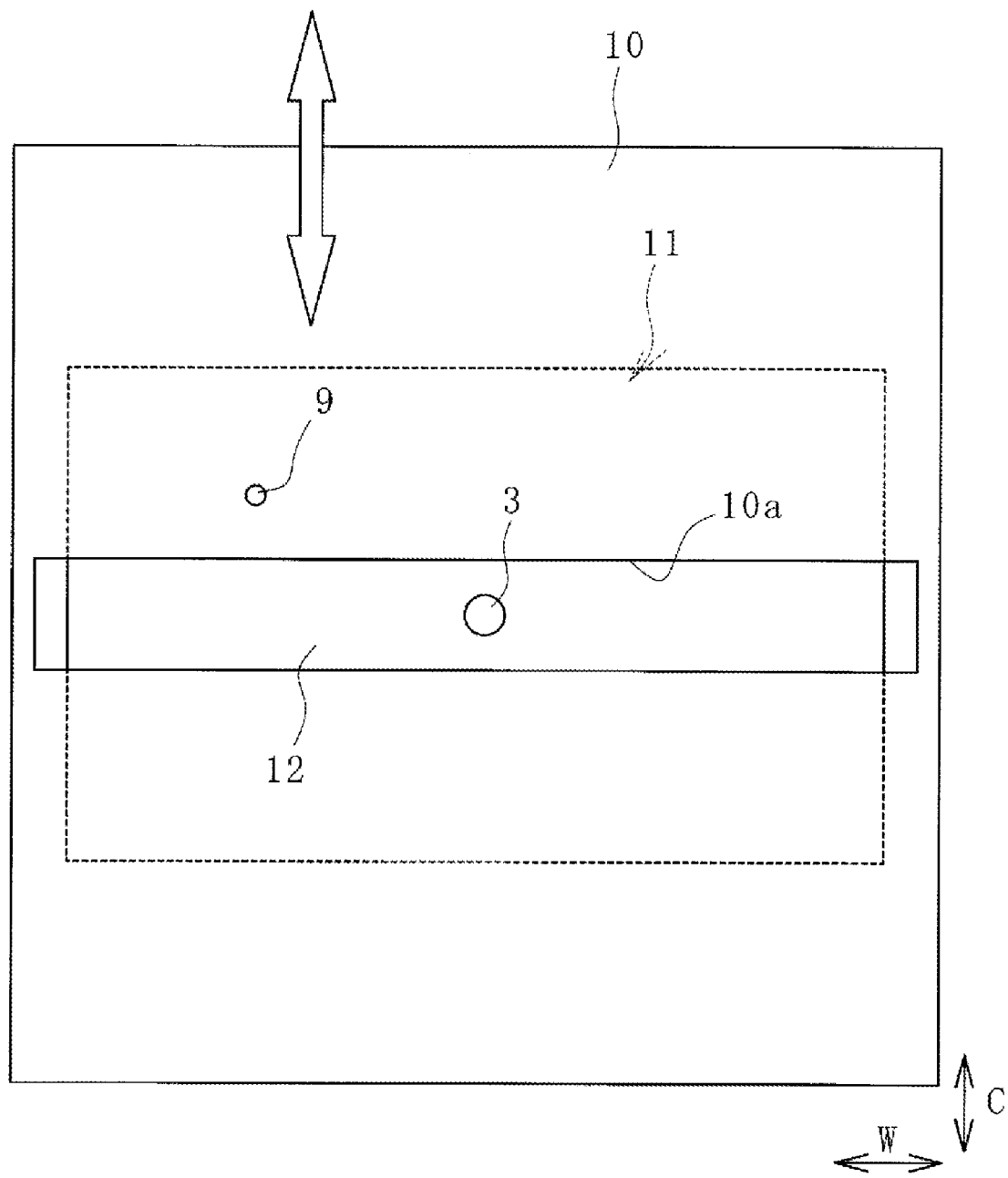
FIG. 7 is an explanatory diagram illustrating the cover and the mold of FIG. 6 in a plan view.

Since the inert gas G is likely to accumulate downward in the atmosphere, the laser beam L can be radiated in a state where, as illustrated in FIGS. 6 and 7, a space S including the irradiation range and a surrounding range of the irradiation range is filled with the inert gas G. In the present embodiment, a cover 10 adapted to surround the space S in the irradiation range and a surrounding range thereof is provided to bring a state where the inert gas G is supplied into and fills the space S.

The cover 10 includes an opening 10a that extends in the tire lateral direction on the upper surface thereof. The laser head 3 irradiates the molding surface 12 with the laser beam L while moving in the extending direction of the opening 10a. Since the cover 10 is movable with respect to the mold 11, the cover 10 is moved in accordance with the movement of the laser head 3 in the tire circumferential direction, and thus the entire molding surface 12 can be cleaned.

The cover 10 as just described is provided, and thus diffusion of the inert gas G is inhibited, and the inert gas G in the space S is easily maintained at a high concentration. However, since the inert gas G does not rapidly diffuse in the atmosphere, the cover 10 is omitted, and the inert gas G is simply supplied into the space S to bring the space S into a state of being filled with the inert gas G.

The mold 11 cleaned as just described is used, and thus unvulcanized rubber (green tire) is vulcanized to produce a tire, and then the tire (vulcanized rubber) is released from the mold 11. According to the present technology, there occurs no defect such as a rubber defect resulting from the adhering and remaining of the vulcanized rubber on the molding surface 12 cleaned with the laser beam L.

The inventors of the present technology have confirmed that when the laser beam L is radiated onto the molding surface 12 in the atmosphere as in the related art to remove the dirt X and then the cleaned molding surface 12 is enlarged and observed, ultrafine protrusions that may not be formed in other cleaning methods are formed. The ultrafine projections have nearly the height of nm level (about 1 nm to several hundred nm). On the other hand, the inventors of the present technology have confirmed that when the molding surface 12 is cleaned with the laser beam L radiated under the atmosphere of the inert gas G, the aforementioned ultrafine protrusions are prevented from being formed on the cleaned molding surface 12.

Accordingly, it is supposed that the ultrafine protrusions formed on the molding surface 12 cleaned with the laser beam L radiated cause the vulcanized rubber to adhere and remain on the cleaned molding surface 12 when the vulcanized rubber is released in a vulcanization step. In the present technology, the dirt X is removed with the laser beam L under the atmosphere of the inert gas G at the high concentration. In other words, the laser beam L is radiated in an atmosphere from which air (a normal atmospheric component) is eliminated, and thus ultrafine protrusions may be prevented from being formed on the molding surface 12 cleaned with the laser beam L. Consequently, a simple means of bringing the irradiation range of the laser beam L into the atmosphere of the inert gas G can prevent a defect such as a rubber defect in a rubber product, which is caused by the adhering and remaining of the vulcanized rubber on a cleaning target portion cleaned with the laser beam L.

The concentration of the inert gas G in the irradiation range of the laser beam L is set to an appropriate range, and the amount of the inert gas G supplied from the gas supply unit 7 is controlled to be within the set appropriate concentration range. The appropriate concentration range of the inert gas G corresponds to, for example, atmospheres of the inert gas G at a plurality of different concentration levels under which the molding surface 12 is cleaned with the laser beam L set in certain irradiation conditions. For the molding surface 12 cleaned under the atmosphere at each of the concentration levels, how much of the vulcanized rubber adheres and remains when being released from the mold is grasped. Then, the concentration of the inert gas G when no vulcanized rubber adheres and remains on the molding surface 12 may be set as the appropriate concentration range of the inert gas G in the certain irradiation conditions of the laser beam L.

Note that the main purpose of supplying the inert gas G is to not form the aforementioned ultrafine protrusions on the molding surface 12 from which the dirt X is removed by radiating the laser beam L. Accordingly, it is not necessary to blow off the removed dirt X by the jet flow of the inert gas G supplied from the supply nozzle 9. Consequently, in the present technology, the inert gas G is supplied so that the dirt X removed by radiating the laser beam L is not blown off by the jet flow of the inert gas G, and it is sufficient that the irradiation range in which the laser beam L is radiated is brought into the atmosphere of the inert gas G.

Figure 8:
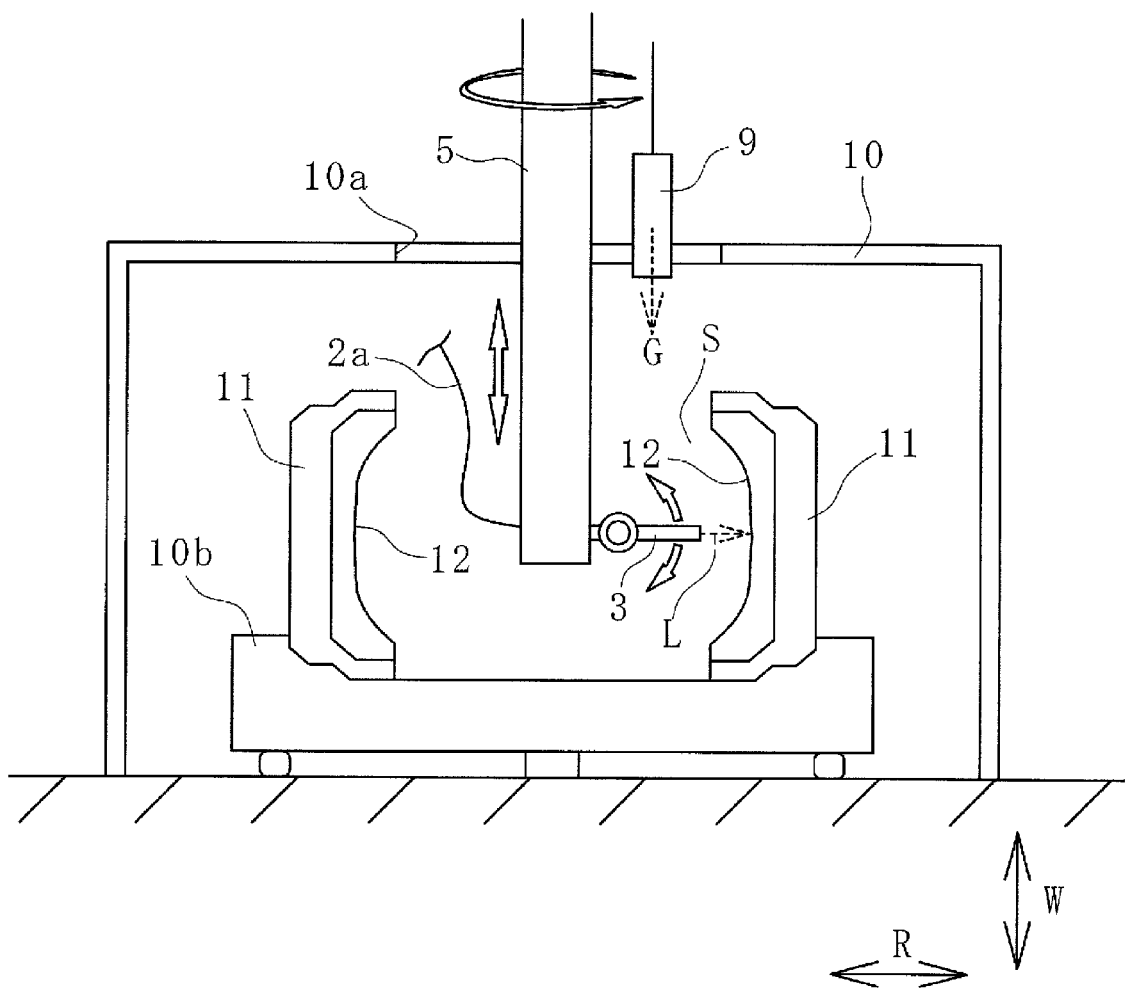
FIG. 8 is an explanatory diagram illustrating a state of cleaning the mold by a cleaning device according to another embodiment of the present technology in a cross-sectional view.
Figure 9:
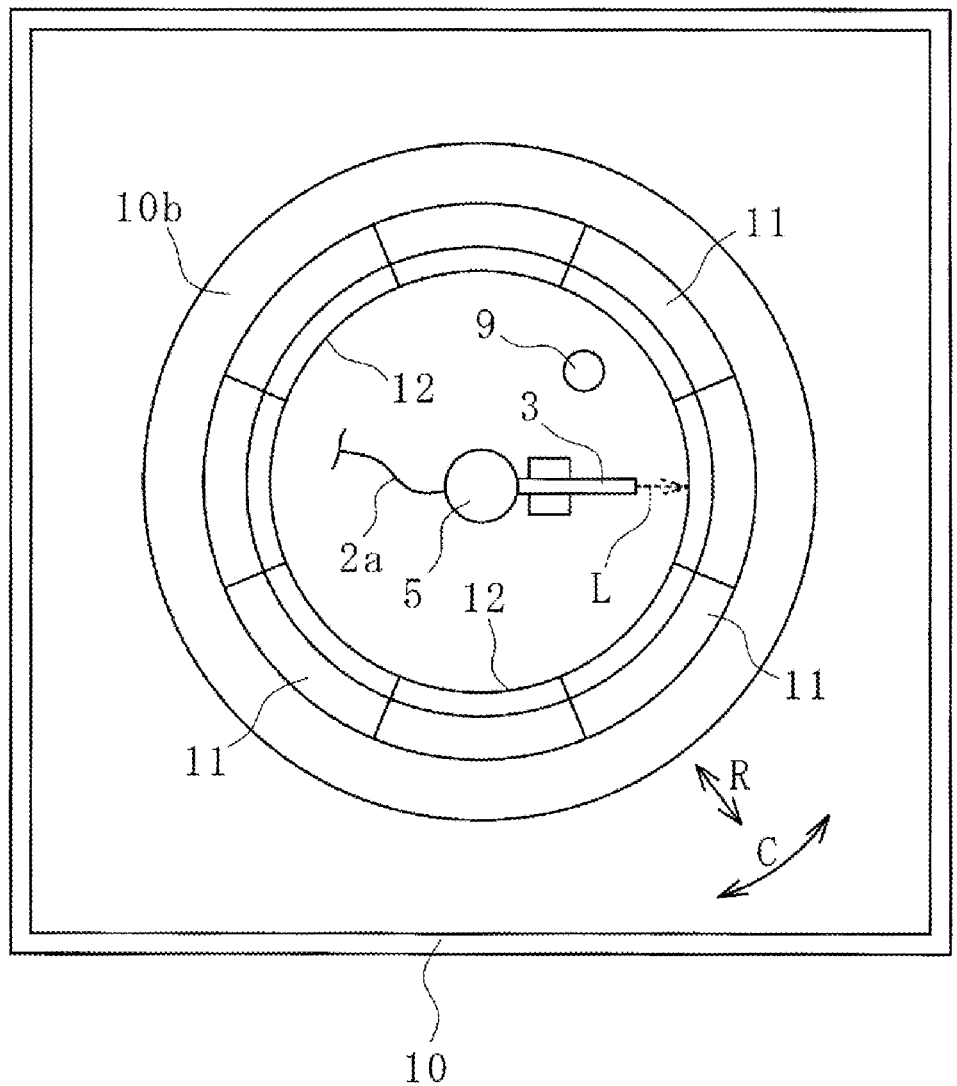
FIG. 9 is an explanatory diagram illustrating the inside of the cover of FIG. 8 in a plan view.

In the embodiment of the cleaning device 1 illustrated in FIGS. 8 and 9, the plurality of sector molds 11 are cleaned at a time. In other words, the number of sector molds 11 required to vulcanize a single green tire is disposed in an annular shape with the molding surface 12 disposed inward thereon. Each of the molds 11 is mounted on a pedestal 10$b$. Each mold 11 is covered by the cover 10 having the opening 10$a$ in the upper surface thereof.

The arm 5 movable in the up-down direction is inserted in the opening 10$a$ to extend in the up-down direction at the center of the annular shape of the molds 11 disposed in the annular shape. The laser head 3 is attached to the end portion of the arm 5. The supply nozzle 9 is attached to the upper surface of the cover 10. The arm 5 is rotatable about the axial center in the up-down direction, and the laser head 3 also rotates with the arm 5. The laser head 3 is capable of oscillating up and down.

In the event of cleaning the molding surface 12 of each mold 11, the laser beam L is radiated from the laser head 3 while the arm 5 is being rotated. In addition, the up and down movement of the arm 5 and the up and down oscillation of the laser head 3 are performed as appropriate, and thus the laser head 3 is moved to the required range of the molding surface 12 and then cleans the molding surface 12 with the laser beam L. The inert gas G is supplied from the supply nozzle 9 to the inside of the cover 10, and thus the space S covering the irradiation range of the molding surface 12 irradiated with the laser beam L and a surrounding range thereof is brought into a state of being filled with the inert gas G. As just described, the irradiation range of the laser beam L is brought into the atmosphere of the inert gas G, and cleaning is performed.

In the present embodiment, advantageously, the multiple molds 11 can be cleaned at a time. Rather than a structure in which the arm 5 is rotated about the axial center in the up-down direction, the pedestal 10$b$ can be configured to rotate about the axial center of the arm 5 in the up-down direction. Additionally, in the present embodiment, each of the molds 11 disposed in an annular shape prevents diffusion of the inert gas G supplied into the space S. In other words, each of the molds 11 also functions as the cover 10, and thus, even when the cover 10 is omitted, a state where the space S filled with the inert gas G can be maintained for a relatively long period of time.

According to the present technology, the dirt X can be efficiently removed even when the mold 11 includes the molding surface 12 having a complex shape, such as a studless-tire vulcanization mold or a cast splicing mold for pneumatic tire vulcanization. In addition, at the time of releasing the vulcanized rubber in the vulcanization step, a rubber defect in the tire can be prevented from being caused by the adhering and remaining of the vulcanized rubber on the cleaned molding surface 12.

Note that the present technology is not limited to the molding surface 12 and can alternatively be applied in a case where facing surfaces (opposed surfaces) of the adjacent molds 11 are cleaned as cleaning target portions.

EXAMPLE

Molding surfaces were cleaned in two ways such as a case (Conventional Example) where a molding surface of a studless-tire vulcanization mold for a passenger vehicle is irradiated with a laser beam and an irradiation range is brought into the atmosphere; and a case (Example) where such an irradiation range is brought into an atmosphere of nitrogen gas. The differences between Conventional Example and Examples were only whether the irradiation range was in the atmosphere or in the atmosphere of nitrogen gas, and other conditions were the same. In Example, the nitrogen gas was supplied from a common nitrogen gas cylinder (volume 47 L) toward the molding surface. The supply amount of nitrogen gas was set to not less than 10 cc/sec.

Green tires were vulcanized with the mold cleaned. Then, it was confirmed whether a rubber defect was caused in each of the tires by the adhering and remaining of vulcanized rubber on the molding surface when the vulcanized rubber was released from the mold (the number of samples N is five tires). As a result, rubber defects generated in all of the tires in Conventional Example while there were no rubber defects in the tires in Example.

The invention claimed is:

1. A method for cleaning a vulcanization mold by irradiating a cleaning target portion of the vulcanization mold with a laser beam, the method comprising:
providing the vulcanization mold for a tire, and
bringing an irradiation range of the cleaning target portion irradiated with the laser beam into an atmosphere of inert gas, thereby preventing forming of ultrafine protrusions having a height of nm level on a surface of the cleaning target portion cleaned by being irradiated with the laser beam,
wherein an output of a light source of the laser beam is 1 W or greater and 5 kW or less, a pulse width of the laser beam is 11 ns or greater and 500 ns or less, a pulse energy of the laser beam is 1 mJ or greater and 0.1 J or less, a pulse frequency of the laser beam is 3.1 kHz or greater and 100 kHz or less, a beam diameter of the laser beam is from 0.1 mm to 3 mm, and a fluence of the laser beam is 0.5 $J/m^2$ or greater and 4.0 $J/m^2$ or less.

2. The method for cleaning the vulcanization mold according to claim 1, further comprising radiating the laser beam while the inert gas is being supplied toward the irradiation range or a surrounding range of the irradiation range.

3. The method for cleaning the vulcanization mold according to claim 1, further comprising radiating the laser beam in a space including the irradiation range and a surrounding range of the irradiation range is filled with the inert gas.

4. The method for cleaning the vulcanization mold according to claim 3, wherein a cover covering the space including the irradiation range and the surrounding range of the irradiation range is provided, the method further comprising supplying the inert gas into and filling the space covered by the cover.

5. The method for cleaning the vulcanization mold according to claim 3, wherein nitrogen gas is used as the inert gas.

6. The method for cleaning the vulcanization mold according to claim 5, wherein the vulcanization mold is a studless-tire vulcanization mold or a cast splicing mold for pneumatic tire vulcanization.

7. The method for cleaning the vulcanization mold according to claim 1, wherein nitrogen gas is used as the inert gas.

8. The method for cleaning a vulcanization mold according to claim 1, wherein the vulcanization mold is a studless-tire vulcanization mold or a cast splicing mold for pneumatic tire vulcanization.

9. The method for cleaning the vulcanization mold according to claim 1, further comprising rotating a position of the laser beam relative to the vulcanization mold while oscillating the laser beam up and down relative to the vulcanization mold.

10. The method for cleaning the vulcanization mold according to claim 1, wherein the output of the light source of the laser beam is 2.1 kW or greater and 5 kW or less.

11. A cleaning device for a vulcanization mold, comprising:
a laser oscillator; and
a laser head configured to irradiate a cleaning target portion of the vulcanization mold for a tire with a laser beam supplied from the laser oscillator,
the cleaning device comprising a gas supply unit configured to bring an irradiation range of the cleaning target portion irradiated with the laser beam into an atmosphere of inert gas, thereby preventing forming of ultrafine protrusions having a height of nm level on a surface of the cleaning target portion cleaned by being irradiated with the laser beam,
wherein an output of a light source of the laser beam is 1 W or greater and 5 kW or less, a pulse width of the laser beam is 11 ns or greater and 500 ns or less, a pulse energy of the laser beam is 1 mJ or greater and 0.1 J or less, a pulse frequency of the laser beam is 3.1 kHz or greater and 100 kHz or less, a beam diameter of the laser beam is from 0.1 mm to 3 mm, and a fluence of the laser beam is 0.5 $J/m^2$ or greater and 4.0 $J/m^2$ or less.

12. The cleaning device for the vulcanization mold according to claim 11, wherein the gas supply unit comprises a supply nozzle configured to supply the inert gas toward the irradiation range or a surrounding range of the irradiation range.

13. The cleaning device for the vulcanization mold according to claim 11, wherein the gas supply unit comprises: a cover adapted to cover a space including the irradiation range and a surrounding range of the irradiation range in the irradiation range and the surrounding range of the irradiation range; and a supply nozzle configured to supply the inert gas into the space.

14. The cleaning device for the vulcanization mold according to claim 11, wherein the cleaning device is configured to rotate the laser head relative to the vulcanization mold while oscillating the laser head up and down relative to the vulcanization mold.

* * * * *